United States Patent
Mondello et al.

(10) Patent No.: US 11,646,873 B2
(45) Date of Patent: May 9, 2023

(54) SECURE COMMUNICATION FOR A KEY REPLACEMENT

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise (ID)

( * ) Notice: Subject to any disclaimer, the term of this patent is extended or adjusted under 35 U.S.C. 154(b) by 0 days.

(21) Appl. No.: 17/588,696

(22) Filed: Jan. 31, 2022

(65) Prior Publication Data
US 2022/0224519 A1 Jul. 14, 2022

Related U.S. Application Data

(63) Continuation of application No. 16/362,970, filed on Mar. 25, 2019, now Pat. No. 11,240,006.

(51) Int. Cl.
*H04L 9/08* (2006.01)
*H04L 9/32* (2006.01)
*H04L 9/30* (2006.01)

(52) U.S. Cl.
CPC .......... *H04L 9/0825* (2013.01); *H04L 9/0891* (2013.01); *H04L 9/30* (2013.01); *H04L 9/3268* (2013.01)

(58) Field of Classification Search
CPC ... H04L 9/0825; H04L 9/3268; H04L 9/0891; H04L 9/30; H04L 63/1466; H04L 63/068;
(Continued)

(56) References Cited

U.S. PATENT DOCUMENTS 5,144,667 A * 9/1992 Pogue, Jr .............. H04L 9/0841
340/5.72
9,276,743 B2 * 3/2016 Cordeiro De Oliveira Barros .....
H04L 9/14
(Continued)

FOREIGN PATENT DOCUMENTS

CN 106506161 A * 3/2017
CN 108494725 A * 9/2018 ......... H04L 63/0428
(Continued)

OTHER PUBLICATIONS

Benjamin Arazi, Vehicular Implementations of Public Key Cryptographic Techniques, Aug. 1991, IEEE Transactions On Vehicular Technology, vol. 40, No. 3, 8 pages (Year: 1991).*
(Continued)

*Primary Examiner* — Shahriar Zarrineh
(74) *Attorney, Agent, or Firm* — Brooks, Cameron & Huebsch, PLLC

(57) ABSTRACT

The present disclosure includes apparatuses, methods, and systems for secure communication for a key replacement. An embodiment includes a processing resource, memory having a first operator's key, and a vehicular communication component. The vehicular communication component can be configured to provide, to a server, a public key generated along with a private key and decrypt, in response to receipt of a second operator's key (e.g., received in response to providing the public key to the server) encrypted using the public key, the second operator's key using the private key. The vehicular communication component can be configured to replace, in response to decrypting the encrypted second operator's key, the first operator's key with the second operator's key.

18 Claims, 7 Drawing Sheets

(58) Field of Classification Search
CPC . H04L 2209/84; H04L 9/3247; H04L 9/3263; H04L 9/3242; H04L 9/3239
See application file for complete search history.

(56) References Cited

U.S. PATENT DOCUMENTS

| | | | |
|---|---|---|---|
| 2003/0147534 A1* | 8/2003 | Ablay | H04L 9/3271 713/170 |
| 2004/0263316 A1* | 12/2004 | Dix | B60R 25/04 340/5.23 |
| 2005/0099265 A1* | 5/2005 | Dix | G07C 9/00309 340/5.21 |
| 2008/0320263 A1* | 12/2008 | Nemiroff | G06F 21/6209 711/164 |
| 2010/0040234 A1* | 2/2010 | Alrabady | H04W 12/069 380/278 |
| 2011/0264916 A1* | 10/2011 | Fischer | G07C 5/008 713/175 |
| 2013/0150078 A1* | 6/2013 | Furuta | H04W 24/00 455/456.1 |
| 2013/0173112 A1* | 7/2013 | Takahashi | H04L 9/0894 713/168 |
| 2013/0219170 A1* | 8/2013 | Naitou | H04L 63/08 713/153 |
| 2014/0079217 A1* | 3/2014 | Bai | H04L 9/3247 380/270 |
| 2015/0010145 A1* | 1/2015 | Iwashita | H04L 9/0897 380/44 |
| 2015/0052352 A1* | 2/2015 | Dolev | H04L 9/3278 713/156 |
| 2015/0139421 A1* | 5/2015 | Cordeiro De Oliveira Barros | H04L 9/0838 380/255 |
| 2015/0156013 A1* | 6/2015 | Zhao | H04L 63/08 380/270 |
| 2015/0161832 A1* | 6/2015 | Esselink | B60R 25/24 340/5.22 |
| 2015/0269801 A1* | 9/2015 | Friedrich | G07C 9/00817 340/5.22 |
| 2017/0118020 A1* | 4/2017 | Xu | H04L 12/66 |
| 2017/0329538 A1* | 11/2017 | Benoit | G06F 3/0679 |
| 2017/0329995 A1* | 11/2017 | Benoit | G06F 21/64 |
| 2018/0006810 A1* | 1/2018 | Ideguchi | H04L 9/3263 |
| 2018/0026949 A1* | 1/2018 | Kimn | H04L 9/0827 713/156 |
| 2018/0254903 A1* | 9/2018 | Bardelski | H04L 9/0894 |
| 2019/0028448 A1* | 1/2019 | Farrell | H04L 63/062 |
| 2019/0052635 A1* | 2/2019 | Liu | H04L 63/0428 |
| 2019/0184916 A1* | 6/2019 | Troia | H04W 12/04 |
| 2019/0190703 A1* | 6/2019 | Lekkas | H04L 9/0822 |
| 2019/0245691 A1* | 8/2019 | Takemori | H04L 9/3226 |
| 2019/0266823 A1* | 8/2019 | Mala | G07C 9/00309 |
| 2019/0312855 A1* | 10/2019 | Sharma | H04L 63/123 |
| 2019/0342275 A1* | 11/2019 | Olive | H04L 9/0861 |
| 2020/0013241 A1* | 1/2020 | Johnson | B60R 25/248 |
| 2020/0153636 A1* | 5/2020 | Takada | H04L 9/3073 |
| 2020/0310776 A1* | 10/2020 | Troia | H04W 12/122 |

FOREIGN PATENT DOCUMENTS

| | | | |
|---|---|---|---|
| CN | 109417480 A * | 3/2019 | G06F 21/33 |
| WO | WO-2010150052 A2 * | 12/2010 | H04L 63/123 |

OTHER PUBLICATIONS

U.S. Appl. No. 15/853,498, entitled, "Physical Unclonable Function Using Message Authentication Code", filed Dec. 22, 2017, 28 pages.

U.S. Appl. No. 16/201,652, entitled, "Parking Infrastructure Powered by a Decentralized, Distributed Database", filed Nov. 27, 2018, 27 pages.

U.S. Appl. No. 15/993,119, entitled, "Transmission of Vehicle Route Information by Passive Devices", filed May 30, 2018, 25 pages.

U.S. Appl. No. 16/034,763, entitled, "Secure Vehicular Communication", filed Jul. 13, 2018, 37 pages.

U.S. Appl. No. 16/034,809, entitled, "Secure Vehicular Services Communication", filed Jul. 13, 2018, 36 pages.

PCT International Application No. PCT/IB2019/000089, entitled, "Method for Improving Safety of a Component or System Running a Firmware or a Finite State Machine", filed Feb. 22, 2019, 42 pages.

* cited by examiner

SECURE COMMUNICATION FOR A KEY REPLACEMENT

PRIORITY INFORMATION

This application is a Continuation of U.S. application Ser. No. 16/362,970, filed on Mar. 25, 2019, which will issue as U.S. Pat. No. 11,240,006 on Feb. 1, 2022, the contents of which are incorporated herein by reference.

TECHNICAL FIELD

The present disclosure relates generally to vehicles, and more particularly, to secure communication for a key replacement.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded MultiMediaCard (e.MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory. Non-volatile memory may be used in a wide range of electronic applications such as personal computers, portable memory sticks, digital cameras, cellular telephones, portable music players such as MP3 players, movie players, among others.

Flash memory devices can include memory cells storing data in a charge storage structure such as a floating gate, for instance. Flash memory devices typically use a one-transistor memory cell that allows for high memory densities, high reliability, and low power consumption. Resistance variable memory devices can include resistive memory cells that can store data based on the resistance state of a storage element (e.g., a resistive memory element having a variable resistance).

Memory cells can be arranged into arrays, and memory cells in an array architecture can be programmed to a target (e.g., desired) state. For instance, electric charge can be placed on or removed from the charge storage structure (e.g., floating gate) of a flash memory cell to program the cell to a particular data state. The stored charge on the charge storage structure of the cell can indicate a threshold voltage (Vt) of the cell. A state of a flash memory cell can be determined by sensing the stored charge on the charge storage structure (e.g., the Vt) of the cell.

DETAILED DESCRIPTION

Figure 1:
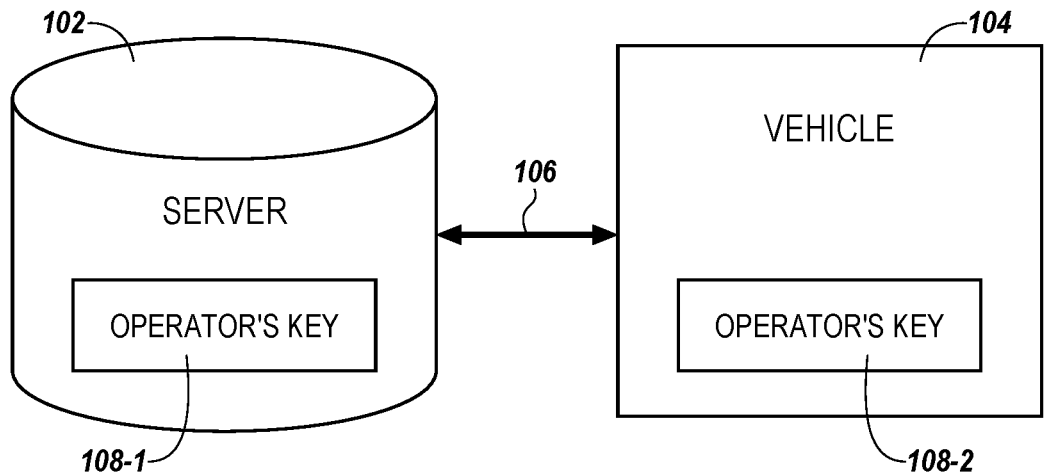
FIG. 1 is a block diagram of a system for secure communication between a server and a vehicle in accordance with an embodiment of the present disclosure.

The present disclosure includes apparatuses, methods, and systems for secure communication for a key replacement. An embodiment includes a processing resource, memory having a first operator's key, and a vehicular communication component. The vehicular communication component can be configured to provide, to a server, a public key generated along with a private key and decrypt, in response to receipt of a second operator's key (e.g., received in response to providing the public key to the server) encrypted using the public key, the second operator's key using the private key. The vehicular communication component can be configured to replace, in response to decrypting the encrypted second operator's key, the first operator's key with the second operator's key.

Entities such as vehicular entities (e.g., vehicles) can be implemented with various keys that can be utilized to perform various operations. In an example, those keys implemented within entities can be utilized to access data stored within respective entities. Given that those data accessibly using the keys can often be sensitive data, the keys may be desired to be exchanged on a periodic basis and/or when the keys are determined to be compromised.

However, many threats from hackers or other malicious users can affect the security of key exchanges. For example, a hacker or other malicious user may attempt to perform an activities, such as, for instance, a man-in-the-middle (MITM) attack, to monitor, interfere with, and/or intercept wireless key exchanges for malicious purposes. One example of an MITM attack is a replay attack, in which a transmission may be recorded (e.g., using a radio receiver in proximity to the signaler) and then replayed in the future to achieve an unauthorized action. Such hacking activities can cause significant financial loss and/or present significant safety and/or security issues. For instance, a hacker or other malicious user can use an MITM attack to gain unauthorized access to (e.g., break into and/or steal) a vehicle.

Given a level of importance of keeping key exchanges secure, a key implementation often involves a structurally complex key exchange infrastructure (e.g., public key infrastructure (PKI)) and/or protocol (e.g., Diffie-Hellman (DH) key exchange), which can be costly and time-consuming. As such, despite of a necessity of frequent key exchanges (e.g., due to security reasons), those may not be exchanged as frequently as desired.

Accordingly, embodiments of the present disclosure provides a secure way to provide a key exchange mechanism that eliminates a need for key exchange infrastructures and/or complex protocols such as PKI and/or DH key exchange protocol. As an example, embodiments of the present disclosure can utilize a device identification composition engine-robust internet of things (DICE-RIOT) protocol to further achieve a secure key exchange by guaranteeing, for instance, that keys being replaced are from an authorized entity, the mutual authentication of a key provider (e.g., manufacturer) and a key receiver (e.g., vehicular entity), the correctness of the message being communicated, and/or the attestation of data stored in the key provider and the key receiver. Such a DICE-RIOT protocol can be implemented using the existing circuitry (e.g., the existing hardware and/or firmware) of the vehicle and remote device, without having to add additional (e.g., new) components or circuitry dedicated specifically to the secure communication functionality. As such, embodiments of the present disclosure can achieve a secure communication for the key exchange without increasing the size, complexity, and/or cost of the device circuitry (e.g., devices associated with a key provider and/or key receiver), and can be compatible with any devices that implements such a DICE-RIOT protocol.

As used herein, "a", "an", or "a number of" can refer to one or more of something, and "a plurality of" can refer to two or more such things. For example, a memory device can refer to one or more memory devices, and a plurality of memory devices can refer to two or more memory devices.

The figures herein follow a numbering convention in which the first digit or digits correspond to the drawing figure number and the remaining digits identify an element or component in the drawing. Similar elements or components between different figures may be identified by the use of similar digits.

FIG. 1 is a block diagram of a system 100 for secure communication between a server 102 and a vehicle 104 in accordance with an embodiment of the present disclosure. Although one vehicle (e.g., vehicle 104) is illustrated in FIG. 1, embodiments are not so limited such that a number of (e.g., one more) vehicles may (e.g., simultaneously) communicated with a server (e.g., server 102).

The server 102 may be a portion of a network, which can support, as an example, a distributed ledger technology (DLT) such as "block chain" technology. The vehicle 104 can be an autonomous vehicle, a traditional non-autonomous vehicle, a service vehicle, or the like, and that can be referred to as an apparatus.

The server 102 and vehicle 104 can communicate with each other via wireless link 106. Various wireless communication technologies can be implemented within the wireless link 106. As an example, the wireless communication technologies of the wireless link 106 can include different generations of broadband mobile telecommunication technologies (e.g., first through fifth generation (1-5G)), device-to-device (e.g., vehicle to vehicle (v2v)) to communication including Bluetooth, Zigbee, 1-5G and/or long-term evolution (LTE) device-to-device communication technologies, and/or other wireless communication utilizing an additional device (e.g., WiFi utilizing an access point AP), and/or near filed communication (NFC) tags, RFID tags, or the like, although embodiments are not so limited.

The server 102 and vehicle 104 each can include a respective operator's key such as operator's keys 108-1 (e.g., stored in server 102) and 108-2 (e.g., stored in vehicle 104). As used herein, an operator's key may be a key that was generated and/or provided by an operator of a server (e.g., server 102). The operator may be and/or associated with a manufacturer of a vehicle. In this example, the operator's key 108-2 may be a key that is previously provided (e.g., initially implemented) by the manufacturer.

Operator's key (e.g., operator's key 108-2) within vehicular entities (e.g., vehicle 104) can be utilized by an operator (e.g., manufacturer) to access data stored in vehicular entities. The data accessed by the manufacturer and/or service provider can be utilized to determine various statuses of (e.g., diagnose) the vehicular entities, which can allow, for example, manufacturer and/or service provider to provide various services (e.g., maintenance services) in consistent with the diagnosed statuses of the vehicular entities. The data accessible by the manufacturer and/or service provider can include data related to emission control system, engine and transmission electronic control unit (ECU), and/or unified diagnostic service (UDS), although embodiments are not so limited. Further, those keys implementable by the manufacturers can include a server root key (SRK), a test mode key (TMK), a client server root key (C_SRK), a unified diagnostic service (UDS) key and/or a unique secret key (e.g., device secret 558 in FIG. 5), although embodiments are not so limited.

Figure 3:
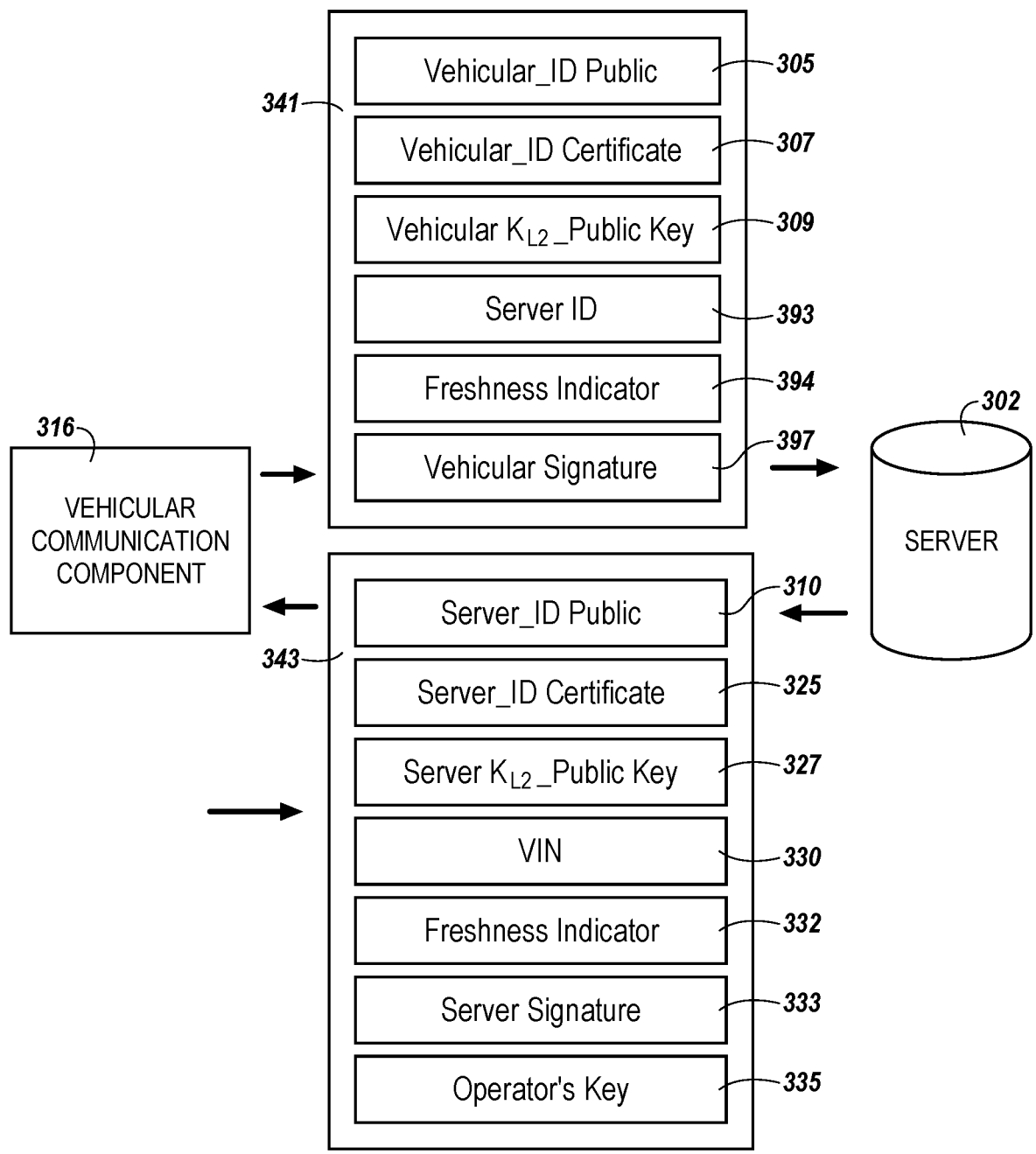
FIG. 3 is an illustration of an exchange of authentication data between a server and a vehicular communication component in accordance with an embodiment of the present disclosure.

In some embodiments, operator's keys can be designed to remain as private to vehicle 104. Accordingly, it is desired to replace operator's keys periodically and/or upon determining that at least one of those keys are compromised. To replace the keys, the server 102 may securely communicate with vehicle 104 to replace an operator's key implemented within vehicle 104 with a new operator's key. As an example, data (e.g., operator's key) exchanged between server 102 and vehicle 104 can be performed using a number of encryption and/or decryption methods as described below. The securing of the data can insure that nefarious activity is prevented from interfering with the emergency and/or vehicle data provided to the vehicular entity and/or the emergency entity. Further details of secure data exchanges are described in connection with FIG. 3.

Figure 2:
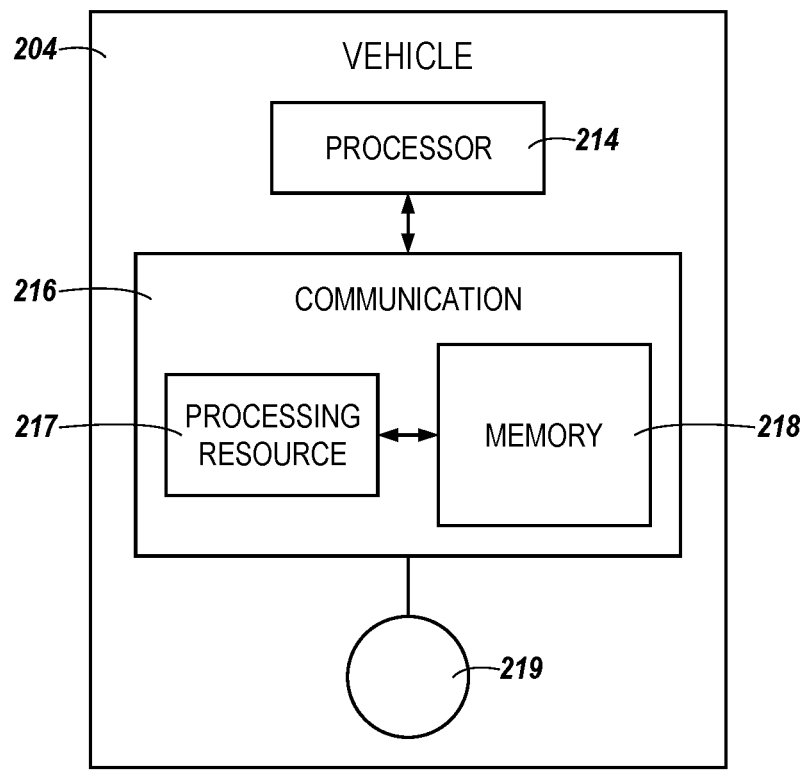
FIG. 2 is a block diagram of an example vehicle in accordance with an embodiment of the present disclosure.

FIG. 2 is a block diagram of an example vehicle 204 in accordance with an embodiment of the present disclosure. Vehicle 204 can be, for instance, vehicle 104, previously described in connection with FIG. 1.

As shown in FIG. 2, vehicle 204 can include a processing resource (e.g., processor) 214 coupled to a vehicular communication component 216, such as a reader, writer, transceiver, and/or other computing device or circuitry capable of performing the functions described below, that is coupled to (e.g., or includes) an antenna 219. Vehicular communication component 216 can include logic and/or circuitry that is used to perform the actions recited below (e.g., encrypt/decrypt, execute instructions, etc.). Vehicular communication component 216 can include a processing resource 217 coupled to a memory 218, such as a non-volatile flash memory, although embodiments are not so limited. Memory 218 can include instructions executable by processing resources 214 and/or 217. In an embodiment, vehicular communication component 216 and/or processor 214 can be part of an on-board computer of vehicle 204.

Antenna 219 of vehicle 204 can be in communication with (e.g., communicatively coupled to) server 102 via wireless link 106. In an example, vehicle 204 can include a number of wireless communication devices, such as transmitters, transponders, transceivers, or the like. In an embodiment, wireless communication can be performed using non-volatile storage components that can be respectively integrated into chips, such as microchips. Each of the respective chips can be coupled to an antenna 219. Vehicle 204 can be configured to communicate, via antenna 219, with other entities (e.g., server 102) using various wireless communication technologies, as described in connection with FIG. 1.

FIG. 2 is an illustration of an exchange of data 341 and 343 between a vehicular communication component 316 and a server 302 in accordance with an embodiment of the present disclosure. Vehicular communication component 316 and server 302 can be, for instance, vehicular communication component 116 and server 102, respectively, previously described in connection with FIG. 1.

Data (e.g., packets) 341 and 343 can be exchanged between vehicular communication component 316 and server 302 in response to a request provided by one of vehicular communication component 316 and server 302 to another entity. In one example, server 302 may initiate the exchange by providing a request for a operator's key replacement, and vehicular communication component 316 can provide, in return, the data 341 to server 302. In another example, vehicular communication component 316 can initiate the exchange by providing a request for a operator's key replacement, and server 302 can provide, in return, the data 343 to vehicular communication component 316. The data exchanged can be requested (e.g., initiated) by either server 302 and/or vehicular communication component 316 on a periodic basis and/or upon an occurrence of an event that may necessitate the key replacement (e.g., an event, in which an operator's key currently implemented within a vehicle is determined to be compromised). In an example, the request may be an open (e.g., unencrypted) message.

The data 341 and 343 received at server 302 and vehicular communication component 316, respectively, can be used to verify an identity of each entity (e.g., server 302 and/or vehicular communication component 316). As an example, those information within the data 341 can be used to verify, by server 302, an identity of vehicular communication component 316. Similarly, those information within the data 343 can be used to verify, by vehicular communication component 316, an identity of server 302.

Information included in data 341 and/or 343 can be accepted and/or accessed in response to verifying identities of and/or digital signatures provided by server 302 and/or vehicular communication component 316. In one example, an identity of an entity (e.g., server 302 and/or vehicular communication component 316) can be verified based on a comparison among a public key (e.g., vehicular public key 309 and/or server public key 327), a public identification (e.g., vehicular public identification 305 and/or server public identification 310), and a certificate (e.g., vehicular certificate 307 and/or server certificate 325), which are described further in connection with FIG. 8. In another example, information included in data 341 and/or 343 can be accessed when based on a digital signature (e.g., vehicular signature 397 and/or server signature 333) is verified. As described herein, a digital signature is generated using (e.g., based on) a private key of a respective entity. As an example, the vehicular signature 397 can be generated using vehicular private key (e.g., private key 671 or 772 respectively in FIGS. 6 and 7), and the server signature 333 can be generated using server private key (e.g., private key 671 or 772 respectively in FIGS. 6 and 7).

Additionally, the data 341 and/or 343 may include further information that identifies an entity the information are supposed to be directed to. As an example, the data 343 can include a vehicle identification number (VIN) identifier 330 for vehicle associated with vehicular communication component 316. A "VIN identifier", as used herein, can be and/or include the VIN itself, a portion of the VIN, or an identifier derived from the VIN. For instance, the VIN identifier can enable vehicular communication component 316 to distinguish between a request directed at it and a request directed at another vehicle. Other identifications for vehicular communication component 316 can also be used, such as, for instance, a serial number, registration tag, or other code uniquely identifying vehicular communication component 316. Similarly, as an example, the data 341 can include a server identifier 393 for server 302 that can enable server 302 to distinguish between a request directed at it and a request directed at another server.

In response to verifying an identity of an entity (e.g., transmitter of data 341 and/or 343) and digital signature provided by the entity, information of data 341 and/or 343 can be accepted and accessed. As an example, the data 343 can include an operator's key that is to replace existing operator's key of a vehicle associated with vehicular communication component 316. As an example, the data 343 can include information associated with a particular component (e.g., on-board component of a vehicle associated with vehicular communication component 316) associated with the operator's key. In this example, the vehicular communication component 316 can forward the received operator's key to a respective component of the vehicle. As an example, although not illustrated in FIG. 3, the data 341 and 343 can include messages (e.g., payload) being transmitted to another entity. In this example, server 102 can transmit a message to vehicle 104 that an operator's key needs to be replaced, and/or vehicle 104 can transmit a message to vehicle 104 that a result of a key replacement (e.g., success and/or failure). Often these accessible information can be provided as encrypted and decrypted at a receiving device, as described below.

An entity that has received data (e.g., data 341 and/or 343) may utilize a received public key to encrypt information. As an example, server 302 can encrypt, using vehicular public key 309, an operator's key 335 to be sent to vehicular communication component 316. The encrypted operator's key 335 can be sent to vehicular communication component 316, which can decrypt the encrypted operator's key 335 using a vehicular private key (e.g., private key 671 or 772, respectively in FIGS. 6 and 7). Further details of encrypting and decrypting data and/or information using public key and/or private key, respectively, are described in connection with FIGS. 6-7.

Data 341 and 343 can include freshness indicator (e.g., anti-replay value), respectively, 394 and 332. The freshness indicators 394 and 332 can be a monotonically increasing count or a NONCE (e.g., an arbitrary number that is used only once), and can be used to prevent (e.g., eliminate), once respective freshness indicators 394 and 332 being verified, the possibility of replay.

Figure 4:
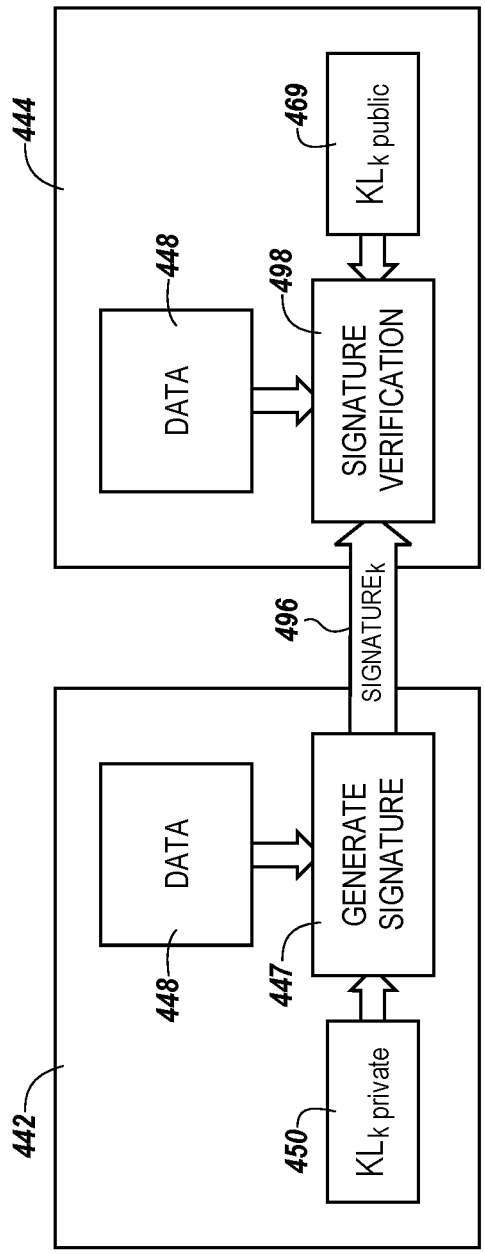
FIG. 4 illustrates an example of digital signature generation and verification in accordance with a number of embodiments of the present disclosure.

FIG. 4 illustrates an example of digital signature generation and verification in accordance with an embodiment of the present disclosure. In the example of FIG. 4, a transmitter 442, which can be server 102 or vehicle 104, can generate the digital signature 496 that can be digital signature 338. A receiver 444, which can be vehicle 104 when server 102 is the transmitter or server 102 when vehicle 104 is the transmitter, can determine whether digital signature 496 is authentic.

Transmitter 442 can generate digital signature 496 at block 447 by generating a cryptographic code, such as a cryptographic hash, of data 448 and encrypting the cryptographic code with a private key 450. Data 448 can be the data in a secure transmission that is to be signed by digital signature 496, such as data 336. In some examples, data 448 can also include the freshness indicator, such as freshness indicator 394 and/or 332, of the digital transmission.

Transmitter 442 can send digital signature 496, data 448, and a public key 469 to receiver 444. Receiver 444 can determine whether digital signature 496 is authentic by performing a signature verification procedure at block 498. For example, the signature verification procedure can include, at block 498, generating a cryptographic code of data 448, decrypting digital signature 496 with public key 469, and comparing decrypted digital signature 496 to the generated cryptographic code. If the generated cryptographic code matches the decrypted digital signature, the digital signature is authentic (e.g., valid). If the generated cryptographic code mismatches the decrypted digital signature, the digital signature is not authentic (e.g., invalid).

In some examples, receiver 444 might determine whether the freshness indicator (e.g., fresh indicators 394 and/or 332) is correct by comparing freshness indicator 340 to a freshness indicator stored in a memory of receiver 444. For example, the stored freshness indicator can be a nonce or a monotonically increasing count generated by monotonic counter of receiver 444.

If the freshness indicator matches the stored freshness indicator, receiver 444 may determine freshness indicator is correct. If freshness indicator 340 mismatches the stored freshness indicator, receiver 444 may determine freshness indicator is incorrect. In some examples, receiver 444 might perform the signature verification in response to determining that freshness indicator is correct. However, receiver 444 might determine that the digital signature is not authentic in response to determining that freshness indicator is incorrect without performing the signature verification procedure at block 498.

In some examples, a secure transmission can be susceptible to malicious attacks aimed at obtaining and/or altering data in the secure transmission. Such attacks can include replay attacks, for example, that can involve the malicious or fraudulent repeat or delay of the secure transmission and can involve intercepting and retransmitting the secure transmission. Verifying the freshness of a secure transmission can guard against (e.g., eliminate) the possibility of replay.

Figure 5:
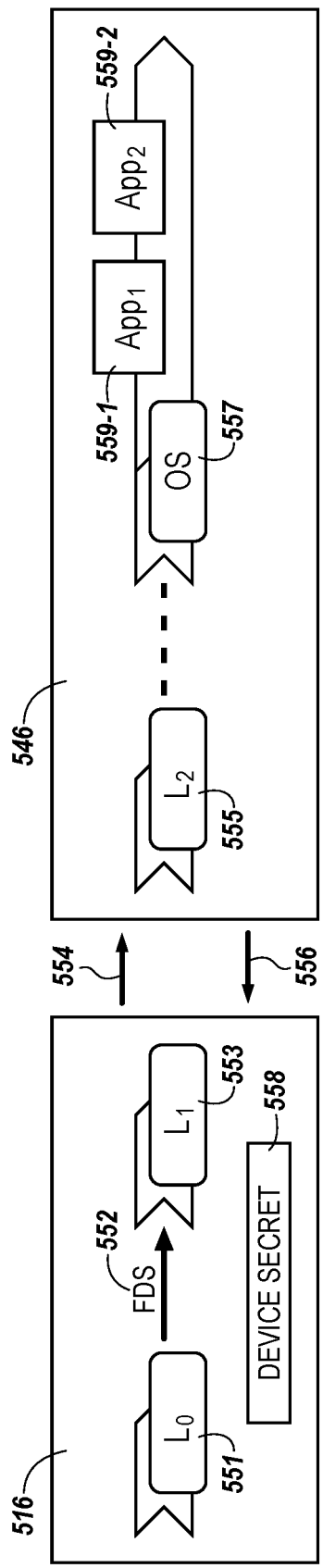
FIG. 5 is a block diagram of an example transmitter/receiver system in accordance with a number of embodiments of the present disclosure.

FIG. 5 is a block diagram of an example system including a transmitter 542 and a receiver 544 in accordance with an embodiment of the present disclosure. Transmitter 542 and receiver 544 can be server 102 and/or vehicle 104, as previously described in connection with FIG. 1. As an example, when the transmitter 542 is server 102, vehicle 104 can be receiver 544, and when the receiver 544 is vehicle 104, the receiver 544 can be server 102.

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. As is illustrated in FIG. 5, Layer 0 ("$L_0$") 551 and Layer 1 ("$L_1$") 553 are within the transmitter 542. Layer 0 551 can provide a Firmware Derivative Secret (FDS) key 552 to Layer 1 553. The FDS key 552 can describe the identity of code of Layer 1 553 and other security relevant data. In an example, a particular protocol (such as robust internet of things (RIOT) core protocol) can use the FDS 552 to validate code of Layer 1 553 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device. A device secret 558 (e.g., unique secret key) can be used to create the FDS 552 and be stored in memory of the transmitter 542, such that FDS 552 is unique to transmitter 542.

The transmitter 542 can transmit data, as illustrated by arrow 554, to the receiver 544. The transmitted data can include an identification that is public (e.g., vehicular public identification 305 and/or server public identification 310 in FIG. 2), a certificate (e.g., a vehicular identification certificate 307 and/or server identification certificate 325), and/or a public key (e.g., vehicular public key 309 and/or server public key 327). Layer 2 ("$L_2$") 555 of the receiver 544 can receive the transmitted data and execute the data in operations of the operating system ("OS") 557 and on a first application 559-1 and a second application 559-2.

In an example operation, the transmitter 542 can read the device secret 558, hash an identity of Layer 1 553, and perform a calculation including:

$$K_{L1} = KDF[Fs(s), Hash(\text{"immutable information"})]$$

where $K_{L1}$ is a public key, KDF (e.g., KDF defined in the National Institute of Standards and Technology (NIST) Special Publication 800-108) is a key derivation function (e.g., HMAC-SHA256), and Fs(s) is the device secret 558. FDS 552 can be determined by performing:

$$FDS = HMAC\text{-}SHA256[Fs(s), SHA256(\text{"immutable information"})]$$

Likewise, the receiver 544 can transmit data, as illustrated by arrow 556, including an identification that is public, a certificate, and/or a public key.

Figure 6:
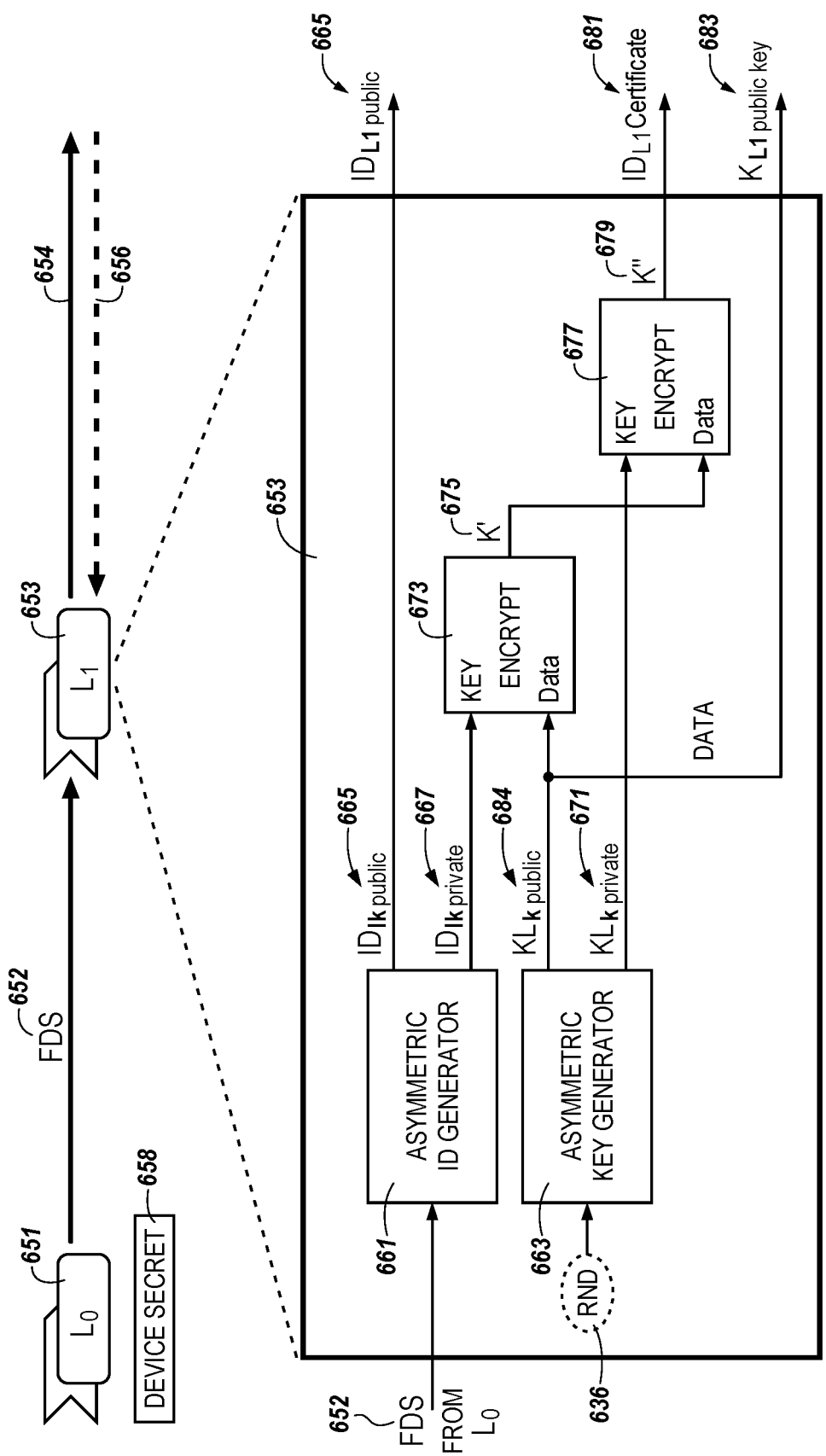
FIG. 6 is a block diagram of an example transmitter in accordance with a number of embodiments of the present disclosure.

FIG. 6 is a block diagram of an example transmitter in accordance with an embodiment of the present disclosure. FIG. 6 is an example of a determination of the parameters including the public identification, the certificate, and the public key that are then sent, indicated by arrow 654, to Layer 2 (e.g., Layer 2 555) of a receiver (e.g., 544 in FIG. 5). Layer 0 ("$L_0$") 651 in FIG. 6 corresponds to Layer 0 551 in FIG. 5 and likewise FDS 652 corresponds to FDS 552, Layer 1 653 corresponds to Layer 1 553, and arrows 654 and 656 correspond to arrows 554 and 556, respectively.

The FDS 652 from Layer 0 651 is sent to Layer 1 653 and used by an asymmetric ID generator 661 to generate a public identification ("$ID_{lk\ public}$") 665 and a private identification 667. In the abbreviated "$ID_{lk\ public}$," the "lk" indicates Layer k (in this example Layer 1), and the "public" indicates that the identification is openly shared. The public identification ("$ID_{L1public}$") 665 is illustrated as shared by the arrow extending to the right and outside of Layer 1 653 of the external communication component. The generated private identification 667 is used as a key input into an encryptor 673. The encryptor 673 can be any processor, computing device, etc. used to encrypt data.

Layer 1 653 of a transmitter (e.g., transmitter 442 in FIG. 4) can include an asymmetric key generator 663. In at least one example, a random number generator (RND) 636 can optionally input a random number into the asymmetric key generator 663. The asymmetric key generator 663 can generate a public key ("$K_{Lk\ public}$") 683 and a private key ("$K_{LK\ private}$") 671 associated with a transmitter such as transmitter 442. The public key 683 can be an input (as "data") into the encryptor 673. The encryptor 673 can generate a result K' 675 using the inputs of the private identification 667 and the public key 683. The private key 671 and the result K' 675 can be input into an additional encryptor 677, resulting in output K" 679. The output K" 679 is the certificate ("$ID_{L1}$ certificate") 681 transmitted to the Layer 2 (555 of FIG. 5). The certificate 681 can provide an ability to verify and/or authenticate an origin of data sent from the transmitter. As an example, data sent from a vehicular communication component (e.g., vehicular communication component 216 in FIG. 2) can be associated with an identity of the vehicular communication component by verifying the certificate, as described in connection with FIG. 4. Further, the public key ("$K_{L1\ public\ key}$") 683 can be transmitted to Layer 2. Therefore, the public identification 665, the certificate 681, and the public key 683 of a Layer 1 653 of a transmitter (e.g., 542 in FIG. 5) can be transmitted to Layer 2 of a receiver (e.g., 544 in FIG. 5).

Figure 7:
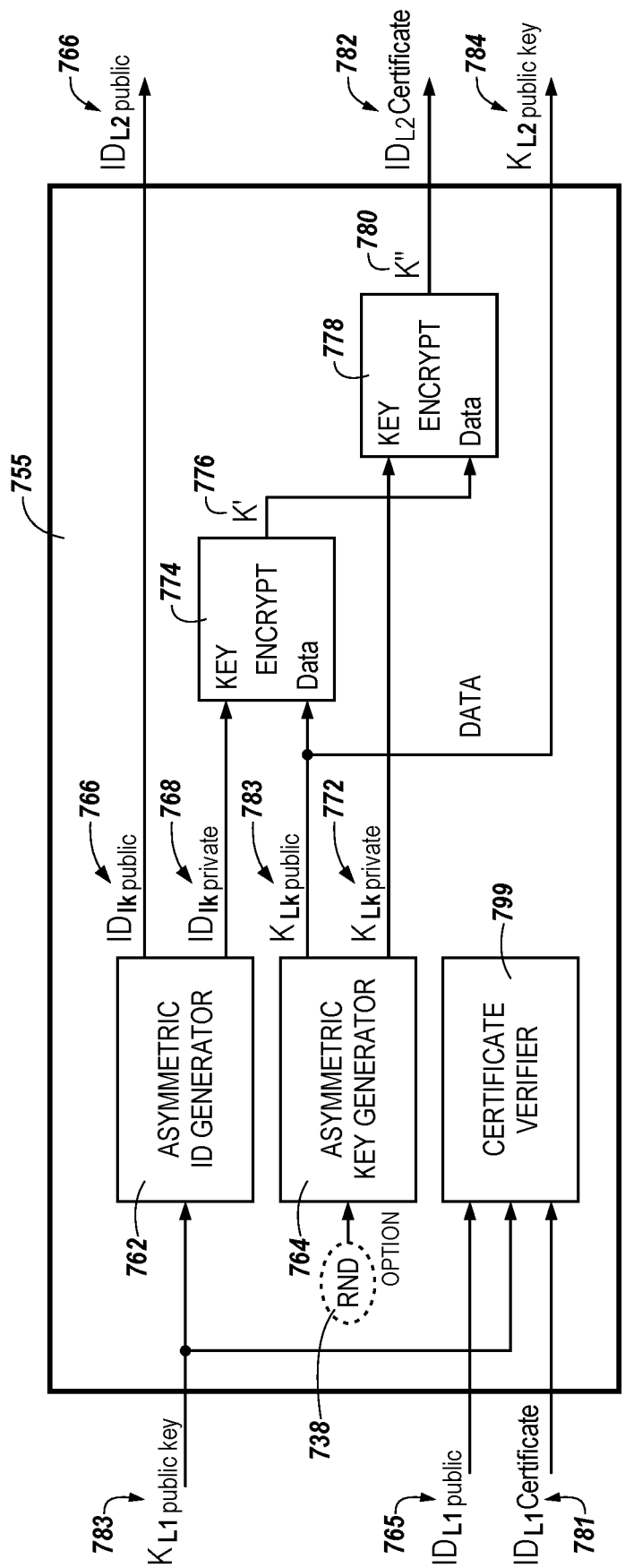
FIG. 7 is a block diagram of an example receiver in accordance with an embodiment of the present disclosure.

FIG. 7 is a block diagram of an example receiver in accordance with an embodiment of the present disclosure. FIG. 7 illustrates a Layer 2 755 of a receiver (e.g., receiver 544 in FIG. 5) generating an identification ("$ID_{L2}$ public") 766, a certificate ("$ID_{L2}$ Certificate") 782, and a public key ("$K_{L2\ public\ key}$") 784.

The public key ("$K_{L1\ public\ key}$") 783 transmitted from Layer 1 of transmitter (e.g., transmitter 542 in FIG. 5) to Layer 2 755 of a receiver, as described in FIG. 6, is used by an asymmetric ID generator 762 of the receiver to generate a public identification ("$ID_{lk\ public}$") 766 and a private identification 768. In the abbreviated "$ID_{lk\ public}$," the "lk" indicates Layer k (in this example Layer 2), and the "public" indicates that the identification is openly shared. The public identification 766 is illustrated as shared by the arrow extending to the right and outside Layer 2 755. The generated private identification 768 is used as a key input into an encryptor 774.

As shown in FIG. 7, the certificate 781 and public identification 765, along with the public key 783, are used by a certificate verifier 799. The certificate verifier 799 can verify the certificate 781 received from transmitter (e.g., transmitter 542), and determine, in response to the certificate 781 being verified or not being verified, whether to accept or discard data received from transmitter.

Layer 2 755 of the receiver can include an asymmetric key generator 764. In at least one example, a random number generator (RND) 638 can optionally input a random number into the asymmetric key generator 764. The asymmetric key generator 764 can generate a public key ("$K_{Lk\ public}$") 784 and a private key ("$K_{LK\ private}$") 772 associated with a receiver such as receiver 544 in FIG. 5. The public key 784 can be an input (as "data") into the encryptor 774. The encryptor 774 can generate a result K' 776 using the inputs of the private identification 768 and the public key 784. The private key 772 and the result K' 776 can be input into an additional encryptor 778, resulting in output K" 780. The output K" 780 is the certificate ("$ID_{L2}$ certificate") 782 transmitted back to the Layer 1 (553 of FIG. 5). The certificate 782 can provide an ability to verify and/or authenticate an origin of data sent from the receiver (e.g., receiver 544 in FIG. 5). As an example, data sent from the receiver can be associated with an identity of the receiver by verifying the certificate, as described in connection with FIG. 4.

Further, the public key ("$K_{L2\ public\ key}$") 784 can be transmitted to Layer 1. Therefore, the public identification 766, the certificate 782, and the public key 784 of the receiver can be transmitted back to Layer 1 of a transmitter.

In an example, in response to a receiver receiving a public key from a transmitter, the receiver can encrypt data to be sent to the transmitter using the vehicular public key. Vice versa, the transmitter can encrypt data to be sent to the receiver using the remote public key. In response to the receiver receiving data encrypted using the remote public key, the receiver can decrypt the data using its own remote private key. Likewise, in response to the transmitter receiving data encrypted using the vehicular public key, the transmitter can decrypt the data using its own vehicular private key. As the remote private key is not shared with another device outside the receiver and the vehicular private key is not shared with another device outside the transmitter, the data sent to the receiver and the transmitter remains secure.

Figure 8:
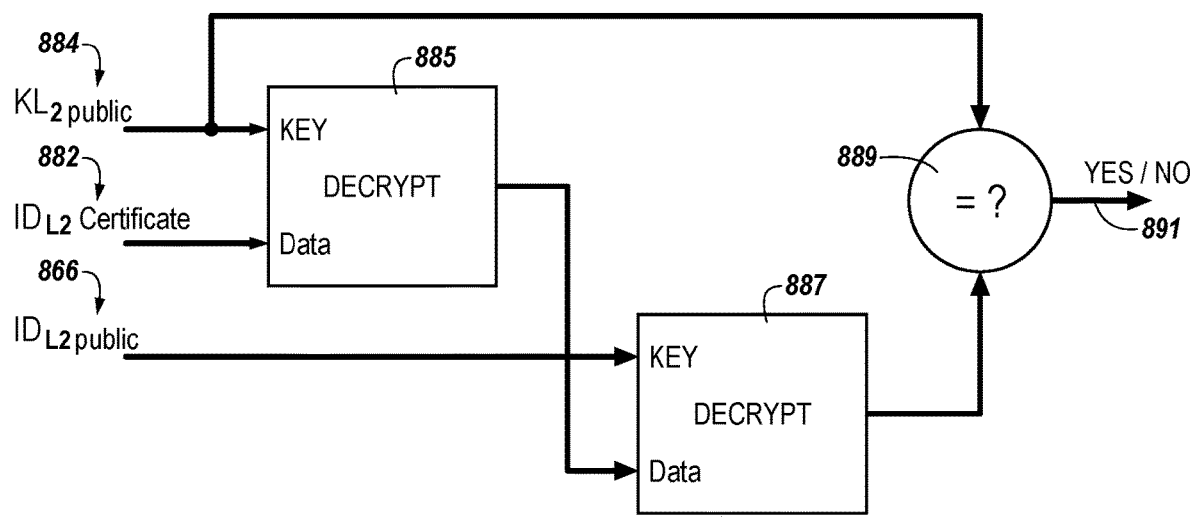
FIG. 8 is a block diagram of an example certificate verifier in accordance with a number of embodiments of the present disclosure.

FIG. 8 is a block diagram of an example certificate verifier 899 in accordance with an embodiment of the present disclosure. In the illustrated example of FIG. 8, a public key 884, a certificate 882, and a public identification is provided from a receiver (e.g., from Layer 2 555 of receiver 544 in FIG. 5). However, embodiments are not so limited. As an example, a public key, a certificate, and a public identification that can be input into the certificate verifier 899 can be public key 683, certificate 681, and public identification 665 provided from a transmitter (e.g., transmitter 542 in FIG. 5).

The data of the certificate 882 and the public key 884 can be used as inputs into a decryptor 885. The decryptor 885 can be any processor, computing device, etc used to decrypt data. The result of the decryption of the certificate 882 and the public key 884 can be used as an input into a secondary decryptor 887 along with the public identification, result in an output. The public key 884 and the output from the decryptor 887 can indicate, as illustrated at 889, whether the certificate is verified, resulting in a yes or no 891 as an output. In response to the certificate being verified, data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 9:
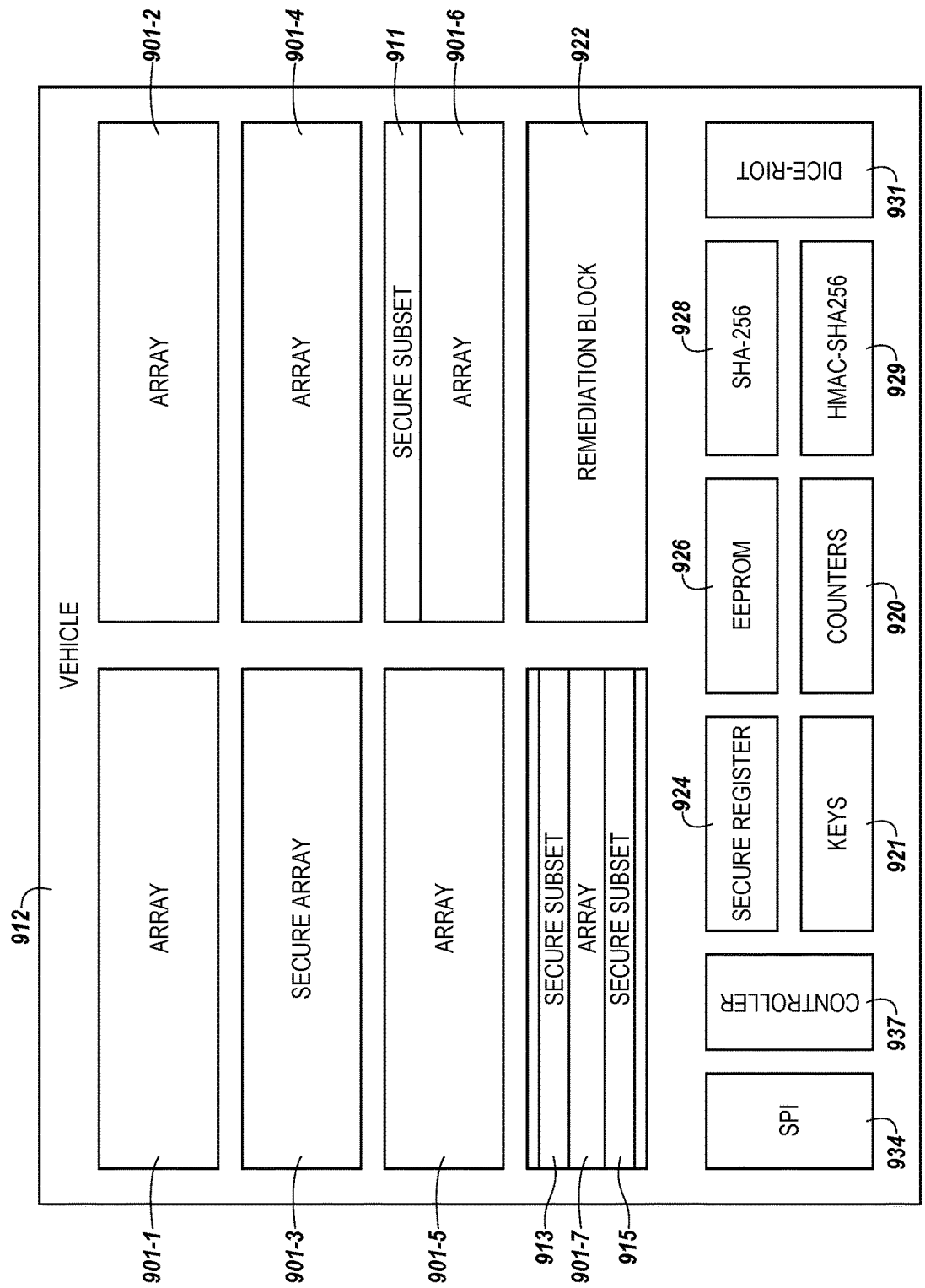
FIG. 9 is a block diagram of an example memory device in accordance with a number of embodiments of the present disclosure.

FIG. 9 is a block diagram of an example memory device 903 in accordance with an embodiment of the present disclosure. The memory device 903 can be, for example, vehicle 104 and/or a memory device configured as at least a part of server 104 described in connection with FIG. 1.

As shown in FIG. 9, memory device 903 can include a number of memory arrays 901-1 through 901-7. Further, in the example illustrated in FIG. 9, memory array 901-3 is a secure array, subset 911 of memory array 901-6 comprises a secure array, and subsets 913 and 915 of memory array 901-7 comprise a secure array. As used herein, a secure portion of a memory, such as, for instance, a secure array, can refer to an area of the memory to be kept under control, and/or an area of the memory that stores sensitive (e.g., non-user) data, such as host firmware and/or code to be executed for sensitive applications. Subsets 911, 913, and 915 can each include, for instance, 4 kilobytes of data. However, embodiments of the present disclosure are not limited to a particular number or arrangement of memory arrays or secure arrays.

As shown in FIG. 9, memory device 903 can include a remediation (e.g., recovery) block 922. Remediation block 922 can be used as a source of data in case of errors (e.g., mismatches) that may occur during operation of memory device 903. Remediation block 922 may be outside of the area of memory device 903 that is addressable by a host.

As shown in FIG. 9, memory device 903 can include a serial peripheral interface (SPI) 934 and a controller 937. Memory device 903 can use SPI 934 and controller 937 to communicate with a host and memory arrays 901-1 through 901-7.

As shown in FIG. 9, memory device 903 can include a secure register 924 for managing the security of memory device 903. For example, secure register 924 can configure, and communicate externally, to an application controller. Further, secure register 924 may be modifiable by an authentication command.

As shown in FIG. 9, memory device 903 can include keys 921. For instance, memory device 903 can include eight different slots to store keys such as the vehicular public and private keys previously described herein, root keys, DICE-RIOT keys, and/or other external session keys.

As shown in FIG. 9, memory device 903 can include an electronically erasable programmable read-only memory (EEPROM) 926. EEPROM 926 can provide a secure non-volatile area available for a host, in which individual bytes of data can be erased and programmed.

As shown in FIG. 9, memory device 903 can include counters (e.g., monotonic counters) 920. Counters 920 can be used as an anti-replay mechanism (e.g., freshness generator) for secure communications between memory device 903 and a remote device, as previously described herein. For instance, counters 920 can include counters 120-1 and 120-2 previously described in connection with FIG. 1.

As shown in FIG. 9, memory device 903 can include an SHA-256 cryptographic hash function 928, and/or an HMAC-SHA256 cryptographic hash function 929. SHA-256 and/or HMAC-SHA256 cryptographic hash functions 928 and 929 can be used by memory device 903 to generate cryptographic hashes, such as, for instance, run-time cryptographic hashes as previously described herein, and/or golden hashes used to validate the data stored in memory arrays 901-1 through 901-7. Further, memory device 903 can support L0 and L1 of DICE-RIOT 931.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a processing resource; and
   memory configured for storing instructions executable by the processing resource;
   wherein the instructions, when executed by the processing resource, cause the processing resource to:
      generate a first public key to provide the first public key to a server;
      generate a first digital signature by generating cryptographic code of a freshness indicator indicative of an anti-replay value and encrypting the cryptographic code with a first private key that was generated by the processing resource along with the first public key;
      provide the first digital signature and the freshness indicator to cause the server to verify the signature based at least in part on the first digital signature and the freshness indicator;
      verify, in response to receipt of vehicular information encrypted at the server using the first public key, an identity of the server based on a comparison among a public identification and a certificate received from the server;
      decrypt the vehicular information using the first private key; and
      operate the apparatus based on the decrypted vehicular information.

2. The apparatus of claim 1, wherein the instructions, when executed by the processing resource, cause the processing resource further to:
   generate a cryptographic code of a freshness indicator received from the server, wherein the freshness indicator is indicative of an anti-replay value;
   decrypt a second digital signature using a second public key generated at, and received from, the server, wherein the second digital signature is generated at the server using the freshness indicator; and
   verify the second digital signature by comparing the decrypted second digital signature to the generated cryptographic code.

3. The apparatus of claim 2, wherein the instructions, when executed, further cause the processing resource to decrypt the vehicular information and operate the apparatus based on the decrypted vehicular information in response to the identity or the second digital signature received being verified.

4. The apparatus of claim 2, wherein the freshness indicator is a monotonically increasing count or a NONCE.

5. The apparatus of claim 4, wherein:
   the freshness indicator received from the server is a first freshness indicator; and
   wherein the instructions are executed to cause the processing resource to determine whether the first freshness indicator is correct based on comparison between the first freshness indicator and a second freshness indicator stored in the apparatus.

6. The apparatus of claim 1, wherein the instructions are executed to cause the processing resource to generate the public identification and the certificate based at least in part on a same input.

7. The apparatus of claim 1, wherein the vehicular information includes an operator's key, vehicle identification number (VIN), or any combination thereof.

8. The apparatus of claim 7, wherein the operator's key comprises:
server root key (SRK);
test mode key (TMK);
client server root key (C_SRK); or
unified diagnostic service (UDS) key; or
any combination thereof.

9. The apparatus of claim 1, wherein the instructions are executed to further cause the processing resource to:
compare, to verify the identity of the server, a second public key to an output of a decryption component, wherein the public identification, the certificate, and the second public key are input into the decryption component;
wherein the second public key is received, along with the public identification and the certificate, from the server.

10. The apparatus of claim 9, wherein the decryption component comprises a first decryptor and a second decryptor, and wherein:
the second public key and the certificate are input into the first decryptor; and
an output of the first decryptor and the second public key are input into the second decryptor, wherein an output of the second decryptor is compared to the second public key.

11. A method, comprising:
receiving, from a server, vehicular information, a public identification, and a certificate, wherein the vehicular information is encrypted using a first public key that was generated at a hardware vehicular communication component;
verifying an identity of the server based on a comparison among the public identification and the certificate;
decrypting the vehicular information using a first private key that was generated along with the first public key at the hardware vehicular communication component; and
operating the hardware vehicular communication component based on the vehicular information;
wherein the method further comprises:
generating a first digital signature by generating cryptographic code of a freshness indicator indicative of an anti-replay value and encrypting the cryptographic code with the first private key; and
providing the first digital signature and the freshness indicator to cause the server to verify the signature based at least in part on the first digital signature and the freshness indicator.

12. The method of claim 11, wherein operating the hardware vehicular communication component based on the vehicular information further comprises replacing the decrypted operator's key with an operator's key stored in the hardware vehicular communication component.

13. The method of claim 11, further comprising:
receiving a freshness indicator indicative of an anti-replay value and a second digital signature generated at the server using the freshness indicator;
generating a cryptographic code of the freshness indicator;
decrypting the second digital signature using a second public key generated at and received from the server; and
verifying the second digital signature by comparing the decrypted second digital signature to the generated cryptographic code.

14. The method of claim 13, further comprising decrypting the vehicular information and operating the hardware vehicular communication component based on the vehicular information responsive to the identity or the second digital signature being verified.

15. A method, comprising:
receiving, from a hardware vehicular communication component and at a server, a first public key;
encrypting vehicular information to be provided to the hardware vehicular communication component using the first public key;
generating a second public key;
generating a digital signature by generating cryptographic code of a freshness indicator indicative of an anti-replay value and encrypting the cryptographic code with a private key that was generated along with the second public key;
providing the digital signature and the freshness indicator to cause the hardware vehicular communication component to verify the signature based at least in part on the digital signature and the freshness indicator;
generating a first public identification and a first certificate based at least in part on the first public key; and
providing the vehicular information along with a public identification and a certificate to the hardware vehicular communication component to cause the hardware vehicular communication component to verify an identity of the server based on a comparison among the public identification and the certificate and decrypt the vehicular information based on the second public key.

16. The method of claim 15, further comprising:
receiving, along with the first public key, a second public identification and a second certificate from the hardware vehicular communication component; and
verifying an identity of the hardware vehicular communication component based at least in part on comparison among the first public key, the second public identification, and the second certificate.

17. The method of claim 16, further comprising:
discarding the first public key, the second public identification, and the second certificate responsive to the identity of the hardware vehicular communication component being verified; and
encrypting and providing the vehicular information responsive to the identity of the hardware vehicular communication component not being verified.

18. The method of claim 15, wherein generating the second public key further comprises generating the second public key based on a random number.

* * * * *